(12) United States Patent
Rimoli et al.

(10) Patent No.: US 11,466,443 B2
(45) Date of Patent: Oct. 11, 2022

(54) ARTICULATED JOINT MECHANISM FOR CABLE-BASED AND TENSEGRITY STRUCTURES

(71) Applicant: GEORGIA TECH RESEARCH CORPORATION, Atlanta, GA (US)

(72) Inventors: Julian Jose Rimoli, Smyrna, GA (US); Claudio V. Di Leo, Atlanta, GA (US); Christine A. Gebara, Houston, TX (US); Juan D. Lavirgen, Buenos Aires (AR)

(73) Assignee: Georgia Tech Research Corporation, Atlanta, GA (US)

( * ) Notice: Subject to any disclaimer, the term of this patent is extended or adjusted under 35 U.S.C. 154(b) by 1140 days.

(21) Appl. No.: 16/065,613

(22) PCT Filed: Dec. 23, 2016

(86) PCT No.: PCT/US2016/068494
§ 371 (c)(1),
(2) Date: Jun. 22, 2018

(87) PCT Pub. No.: WO2017/117043
PCT Pub. Date: Jul. 6, 2017

(65) Prior Publication Data
US 2021/0198886 A1 Jul. 1, 2021

Related U.S. Application Data

(60) Provisional application No. 62/272,409, filed on Dec. 29, 2015.

(51) Int. Cl.
*E04B 1/19* (2006.01)
*F16C 1/08* (2006.01)
*F16C 11/06* (2006.01)

(52) U.S. Cl.
CPC .............. *E04B 1/1903* (2013.01); *F16C 1/08* (2013.01); *F16C 11/06* (2013.01); *E04B 2001/1969* (2013.01); *E04B 2001/1996* (2013.01)

(58) Field of Classification Search
CPC ........... E04B 1/1903; E04B 2001/1966; E04B 2001/1969; E04B 2001/1996; F16C 1/08; F16C 11/06
See application file for complete search history.

(56) References Cited

U.S. PATENT DOCUMENTS 2,102,232 A 12/1937 Austin
3,063,521 A 11/1962 Fuller
(Continued)

FOREIGN PATENT DOCUMENTS

DE 102012003371 A1 8/2013
JP 2008075397 A1 4/2008

OTHER PUBLICATIONS

Fest et al.: "Adjustable Tensegrity Structures"; Apr. 2003; Journal of Structural Engineering, pp. 515-526.
(Continued)

*Primary Examiner* — James M Ference
(74) *Attorney, Agent, or Firm* — Bryan W. Bockhop; Bockhop Intellectual Property Law, LLC

(57) ABSTRACT

In a joint (100) for a structure that includes at least one rod (104) and a plurality of cables (102), each cable (102) having an outside diameter, a rod end (160) is affixable to the rod (104) so that the rod has a rod (104) centerline that passes through the rod end (160). The rod end (160) includes a mechanism (166) that allows the rod end (160) to pivot about a center point that is on the rod centerline. A cable attachment device (150) is couplable to each cable (102) and to the rod end (160). The cable attachment device (150) holds each cable (102) coupled thereto in a relationship to
(Continued)

the rod end (160) so that each cable (102) has a cable centerline that intersects the center point so as to minimize any moments from the rod (104) or the cables (102) on the joint (100).

18 Claims, 5 Drawing Sheets

(56) References Cited

U.S. PATENT DOCUMENTS

| | | | |
|---|---|---|---|
| 3,766,932 A * | 10/1973 | Sidis | E04B 1/3441 135/147 |
| 3,771,274 A * | 11/1973 | Vaughan | E04B 1/19 52/646 |
| 6,606,954 B1 | 8/2003 | Lamoreaux et al. | |
| 6,901,714 B2 | 6/2005 | Liapi | |
| 7,107,733 B1 | 9/2006 | Rueckert | |
| 8,161,687 B2 | 4/2012 | Crettol et al. | |
| 8,613,412 B1 | 12/2013 | Donaldson | |
| 8,833,000 B1 * | 9/2014 | Nadeau | E04B 1/34 52/63 |
| 2002/0002807 A1 * | 1/2002 | Newland | E04B 1/19 52/645 |
| 2003/0009974 A1 * | 1/2003 | Liapi | E04B 1/3211 52/648.1 |
| 2006/0102088 A1 * | 5/2006 | Wroldsen | A01K 61/60 119/223 |
| 2015/0113744 A1 | 4/2015 | Stubler et al. | |
| 2015/0151854 A1 * | 6/2015 | Scolamiero | H01Q 15/161 244/172.6 |
| 2015/0303582 A1 | 10/2015 | Meschini et al. | |
| 2019/0242110 A1 * | 8/2019 | Rimoli | E04B 1/19 |
| 2021/0198886 A1 * | 7/2021 | Rimoli | F16C 1/08 |

OTHER PUBLICATIONS

Hanaor et al.: "Evaluation of Deployable Structures for Space Enclosures"; 2001; International Journal of Space Structures, vol. 16, No. 4, pp. 211-229.

* cited by examiner

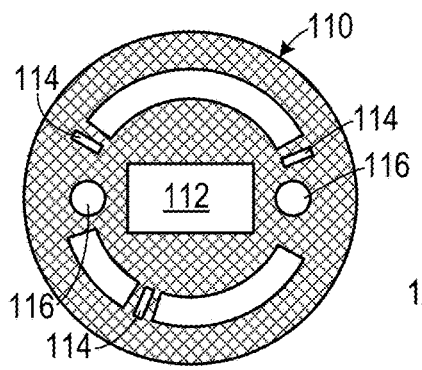
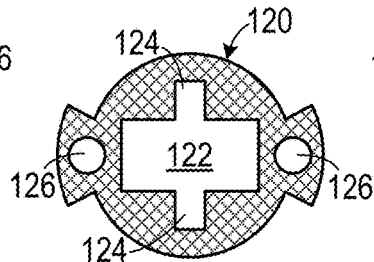
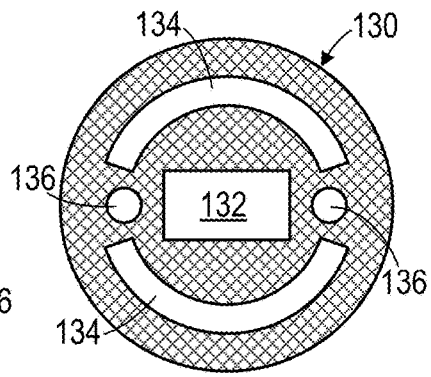
FIG. 2A     FIG. 2B     FIG. 2C
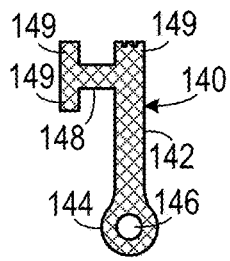
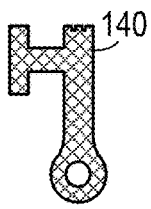
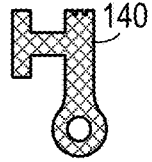
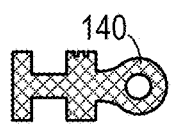
FIG. 3A    FIG. 3B    FIG. 3C    FIG. 3D
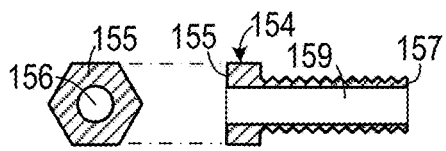
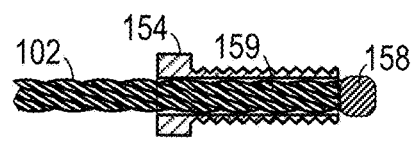
FIG. 4A          FIG. 4B
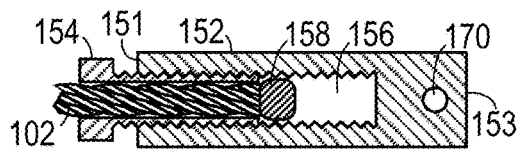
FIG. 4C
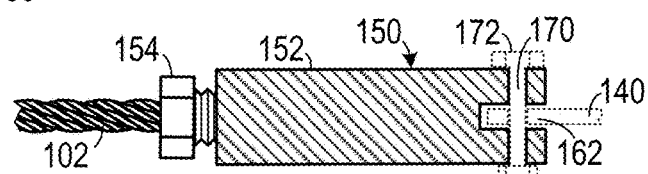
FIG. 4D
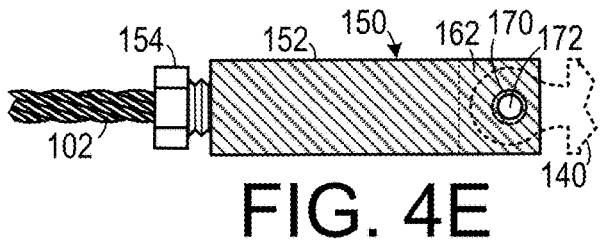
FIG. 4E

ARTICULATED JOINT MECHANISM FOR CABLE-BASED AND TENSEGRITY STRUCTURES

CROSS-REFERENCE TO RELATED APPLICATION(S)

This application claims the benefit of U.S. Provisional Patent Application Ser. No. 62/272,409, filed Dec. 29, 2015, the entirety of which is hereby incorporated herein by reference. This application also claims the benefit of International Patent Application No. PCT/US16/68494, filed Dec. 23, 2016, the entirety of which is hereby incorporated herein by reference.

BACKGROUND OF THE INVENTION

1. Field of the Invention

The present invention relates to components employed in cable and rod-based structures (including tensegrity structures) and, more specifically, to a joint mechanism used in cable and rod-based structures.

2. Description of the Related Art

Tensegrity (a portmanteau for tensile-integrity) structures use isolated components in compression inside a structure of continuous tension. Typically, rods are held by cables under tension apart from each other to form a structure. In tensegrity structures all of the loading members are in only a state of compression or tension. All of the cables are held in tension and are maintained in this stress state as the structure varies. As a result, no structural member is subject to a bending moment during normal loading.

A typical tensegrity structure includes several rods with cables under tension being attached to the ends of the rods. Tension in the cables causes lateral compressive on the rods. For example, U.S. Pat. No. 3,063,521, issued to Fuller, discloses a basic three-rod tensegrity structure in which each end of each rod is coupled via cable to both ends of another rod and one end of the remaining rod.

The joints that couple the ends of the rods to the cables are often fashioned in an ad hoc manner. They can also be complex three-dimensional structures. In some joints, a-symmetry in the connections can result in moments on the joints which result in the disadvantage of increasing the likelihood of mechanical failure of the components. Also, such moments can result in the structure being inclined to deviate from its intended shape.

Therefore, there is a need for a joint for use with rod and cable structures that minimizes the moments of the components.

SUMMARY OF THE INVENTION

The disadvantages of the prior art are overcome by the present invention which, in one aspect, is a joint for a structure that includes at least one rod and a plurality of cables, each cable having an outside diameter. A rod end is affixable to the rod so that the rod has a rod centerline that passes through the rod end. The rod end includes a mechanism that allows the rod end to pivot about a center point that is on the rod centerline. A cable attachment device is couplable to each of the plurality of cables and is coupled to the rod end. The cable attachment device is configured to hold each of the plurality of cables coupled thereto in a relationship to the rod end so that each of the plurality of cables has a cable centerline that intersects the center point so as to minimize any moments from the rod or the cables on the joint.

In another aspect, the cable attachment device includes a plurality of wing members in which each wing member corresponds to a different one of the plurality of cables. A first plate engages each of the wing members so as to hold each wing member in a fixed radial position. A second plate is disposed below the first plate and holds the rod end in a fixed relationship thereto. A third plate is disposed below the second plate opposite the first plate and is attached to the first plate so as to secure the rod end, the second plate, the first plate and each of the plurality of wing members in a fixed spatial relationship. A plurality of cable attachment arms is each configured to attach a different one of the plurality of cables to a corresponding wing member. Each wing member has a dimension so that when a cable attached thereto is under tension and so that the corresponding cable centerline intersects the center point.

In yet another aspect, the invention is a method of making a joint for a structure that includes at least one rod and a plurality of cables, each cable having an outside diameter. A first plate, a second plate, a third plate and a plurality of wing members are each formed from a substantially flat material. The rod is affixed to a rod end. Each of the cables is attached to each of a corresponding plurality of plurality of cable attachment arms. The rod end is secured to the second plate. The wing members are secured to the first plate, the second plate and the third plate by engaging the wing members with notches in the first plate and affixing the first plate, the second plate and the third plate to each other. Each of the plurality of cable attachment arms is attached to a different one of the plurality of wing members. Each of the cables is tensioned to a preselected tension.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIG. 2A is a top plan view of a first plate.

FIG. 2B is a top plan view of a second plate.

FIG. 2C is a top plan view of a third plate.

FIGS. 3A-D are elevational views of different wing member configurations.

FIG. 4A is an end view and a cross-sectional view of a cable-securing screw.

FIG. 4B is a cross-sectional view of a screw with a cable attached thereto.

FIG. 4C is a cross-sectional view of the screw shown in FIG. 4B coupled to an elongated portion of a cable attachment arm.

FIG. 4D is a plan view of a cable attachment arm.

FIG. 4E is an elevational view of a cable attachment arm.

DETAILED DESCRIPTION OF THE INVENTION

Figure 1A:
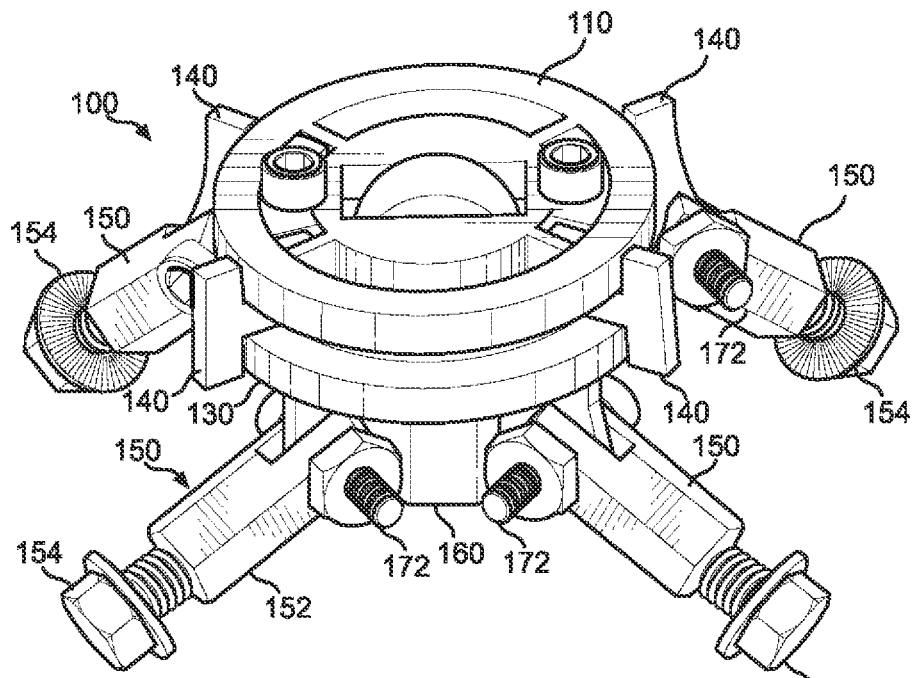
FIG. 1A is a perspective view of one embodiment of a joint for a cable and rod structure.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 1B:
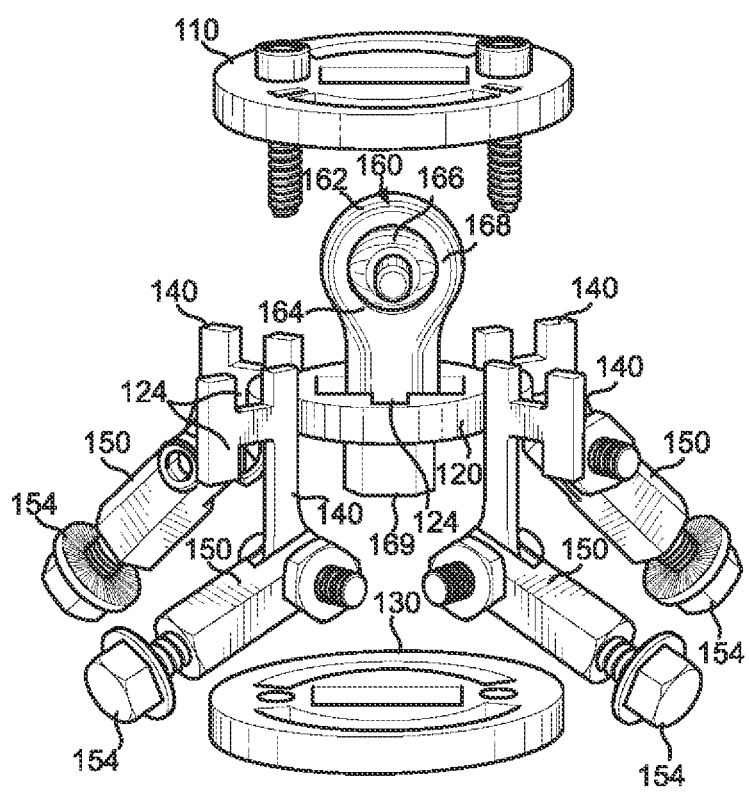
FIG. 1B is an exploded view of the embodiment shown in FIG. 1A.

As shown in FIGS. 1A and 1B, one embodiment of a joint 100 for use in structures that include rods under compression and cables under tension, includes a rod end 160 (for example, one type of rod end is a ball joint rod end available from McMaster-Carr) that is held by a second (center) plate 120 between a first (top) plate 110 and a third (bottom) plate 130. A plurality of wing members 140 are secured by the first plate 110 and the third plate 130. A cable attachment arm 150 is affixed to each one of the wing members 140. The first plate 110, the second plate 120, the third plate 130 and the wing members 140 can all be formed from a sheet material (e.g., sheet metal, sheet composite, sheet plastic, etc.) by being cut therefrom. The cutting methods can include, for example: water jet cutting, plasma torch cutting, laser cutting, die cutting, rotary cutting and lithographic cutting. Alternately, they can be formed by 3D printing, injection molding, and extruding, depending upon the specific application.

The rod end 160 includes a rod holding member 162 that has a rod coupling end 169 that is affixable to the rod. The rod holding member 162 defines a hole 164 that holds a bearing member 166 therein. A pin 168 extends outwardly from each side of the bearing member 166 and is pressed into two oppositely-spaced indents 124 in the second plate 120.

As shown in FIG. 2A, the first plate 110 defines a central rectangular hole 112 configured to receive a portion of a rod end 160 therein. The top plate 110 also defines a plurality of notches 114, each of which is configured to hold a corresponding wing member 140 in a fixed lateral position with respect to the joint. Two holes 116 are also defined by the first plate 110 for accepting bolts (or other fasteners, depending upon the specific application) therein to secure the plates to each other. As shown in FIG. 2B, the second plate 120 defines a central rectangular hole 122 that receives the rod end 160 therein and two bolt holes 126. The third plate 130, as shown in FIG. 2C, defines a central hole 132, two bolt holes 136 and at least one semi-circular opening 134 that is concentric with the central hole 132 (and, thus, the rod end). The semi-circular opening 134 engages the wing member 140 so as to prevent radially outward movement of the wing member 140. The central hole 112 of the first plate 110 and the central hole 132 of the third plate 130 are sized so as to restrict vertical movement of the rod end 160.

As shown in FIGS. 3A-3D, several different configurations of wing members 140 can be used. The specific configuration used depends upon the desired angle of the cable with respect to the joint. As will be discussed in more detail below, the length of the wing member 140 is chosen so that the centerlines of all cables and the rod intersect at a single point in the joint 100.

The wing members 140 include an attachment arm attachment portion 144 that defines a fastener hole 146 passing therethrough and T-shaped structure 148 extending away from the attachment arm attachment portion 144. The T-shaped structure 148 includes two protrusions 149 that engage the notch 114 in the first plate and the semi-circular opening 134 of the third plate 130, respectively. The wing member can also include a lengthening extension 142 to give it the correct length so that the centerline of the cable will intersect the center point.

As shown in FIGS. 4A-4E, each cable attachment arm 150 includes an elongated member 152 that has a first end 151 and an opposite second end 153. A threaded bore 156 extends inwardly from the first end 151. The second end 153 defines a notch 162 that is complimentary in shape to a portion of the wing members 140 and a fastener hole 170. A screw portion 154 has a first end 155 and an opposite second end 157. The screw portion 154 defines an elongated passage 159 that passes from the first end 155 to the second end 157 and has an inside diameter that is greater than the outside diameter of the cables 102 so that a portion of a cable 102 passes through the elongated passage 159. A terminator 158 (such as a piece of metal that is crimped onto the cable 102) is affixed to an end of the cable 102 so as to prevent it from being pulled out of the elongated passage 159. The screw portion 154 is screwed into the bore 156 and a wing member 140 is placed in the notch 162 and affixed to the elongated member 152 with a fastener, such as a bolt 172, and fastened thereto. Once assembled, the cable 102 can be tensioned to a desired tension by tightening or loosening the screw portion 154.

Figure 5A:
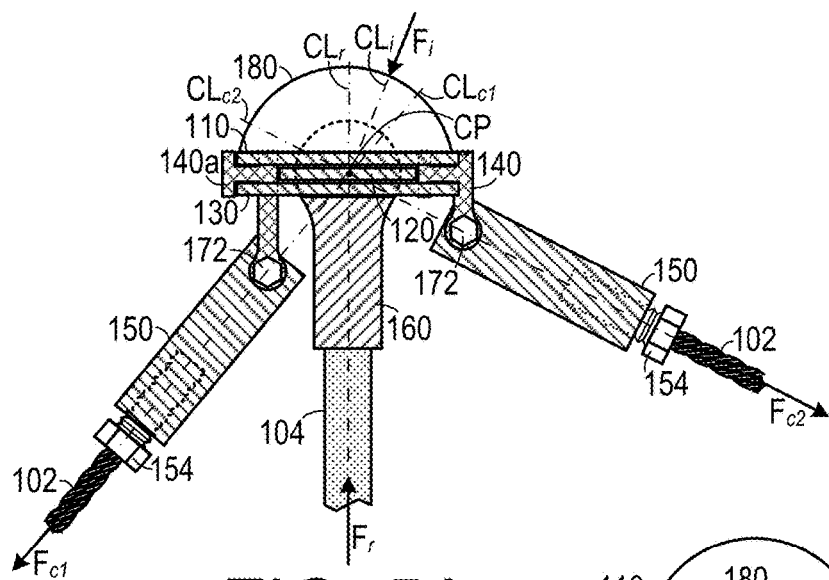
FIG. 5A is a cross sectional view of a joint showing forces applied thereto.
Figure 5B:
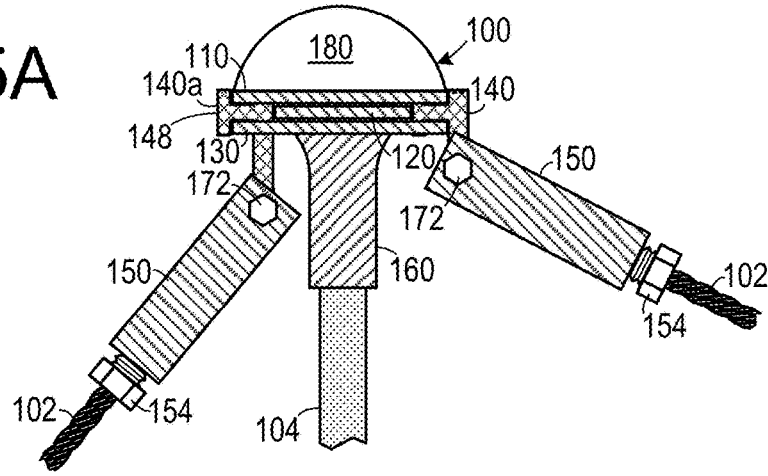
FIG. 5B is an elevational view of a joint.
Figure 5C:
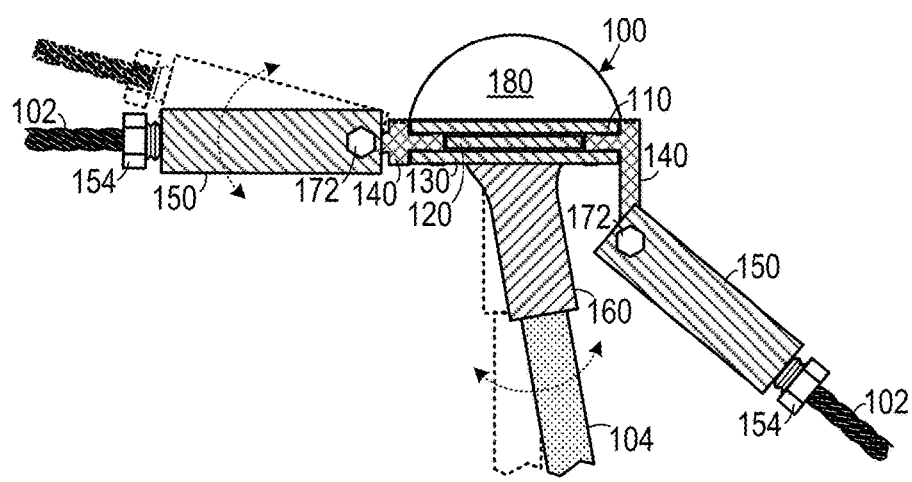
FIG. 5C is an elevational view of a joint with cables attached thereto at different angles from those shown in FIG. 5B.

As shown in FIGS. 5A-5C, the assembled joint 100 directs all of the forces toward a single center point CP as a result of the centerlines of the elements all intersecting at the center point CP. These centerlines include $CL_r$, the centerline of the rod 104 and $CL_{c1}$ and $CL_{c2}$ the centerlines of the cables 102. Because the forces (including the compressive force $F_r$ from the rod 104 and the tensile forces $F_{c1}$ and $F_{c2}$ from the cables 102) are all directed to the center point CP, bending and rotational moments on the components are minimized, thereby reducing the likelihood of mechanical failure of the components.

Also, a spherical cap 180 can be placed on the first plate 110 so as to have a center of curvature corresponding to the center point CP. As a result any impact force $F_i$ experienced by the spherical cap 180 will be directed radially inwardly toward the center point CP. This may be especially important in space-based planetary lander applications where the periphery of the structure can experience impact.

One of the wing members 140a shown in FIGS. 5A and 5B is placed with the T-shaped 148 structure pointing radially outwardly from the joint 100. This may be done when the angle between the cable 102 and the rod 104 is relatively small and allows use of a shorter wing member 140a than would otherwise be required.

The rod end 104 can pivot about the center point CP both angularly and rotationally. As shown in FIG. 5C, this design allows for angular movement of the cables 102 and the rod 104, which can occur during dynamic loading conditions (such as impact or high winds, etc.). This flexibility also reduces the likelihood of mechanical failure.

Figures 6A, 6B, 6C:
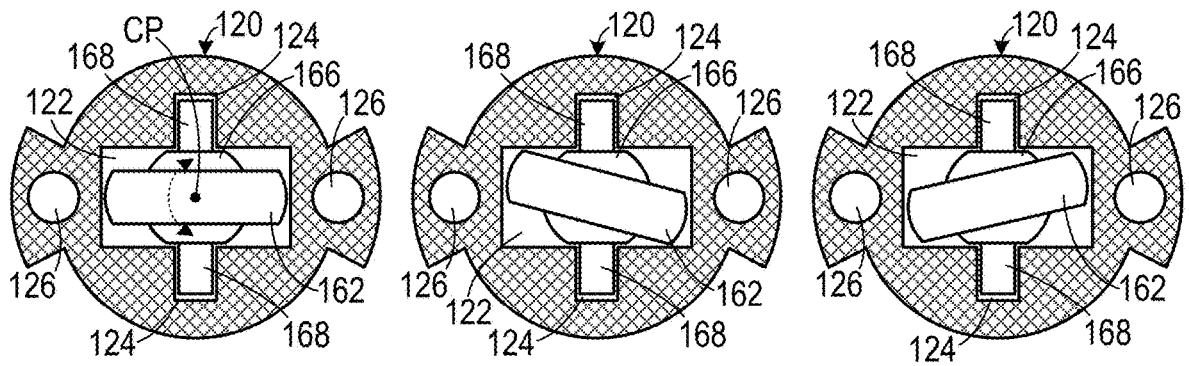
FIG. 6A-C are three plan views of a second plate with a rod holder in place.

The joint 100 also allows for rotational movement of the rod 104, as shown in FIGS. 6A-6C. The bearing member 166 is affixed by the pins 168 to the second plate 120. However, the rod holding member 162 can pivot around the bearing member 166, both laterally and rotationally. This also reduces the likelihood of mechanical failure when the rod 104 is subjected to rotational stress during loading.

Figure 7:
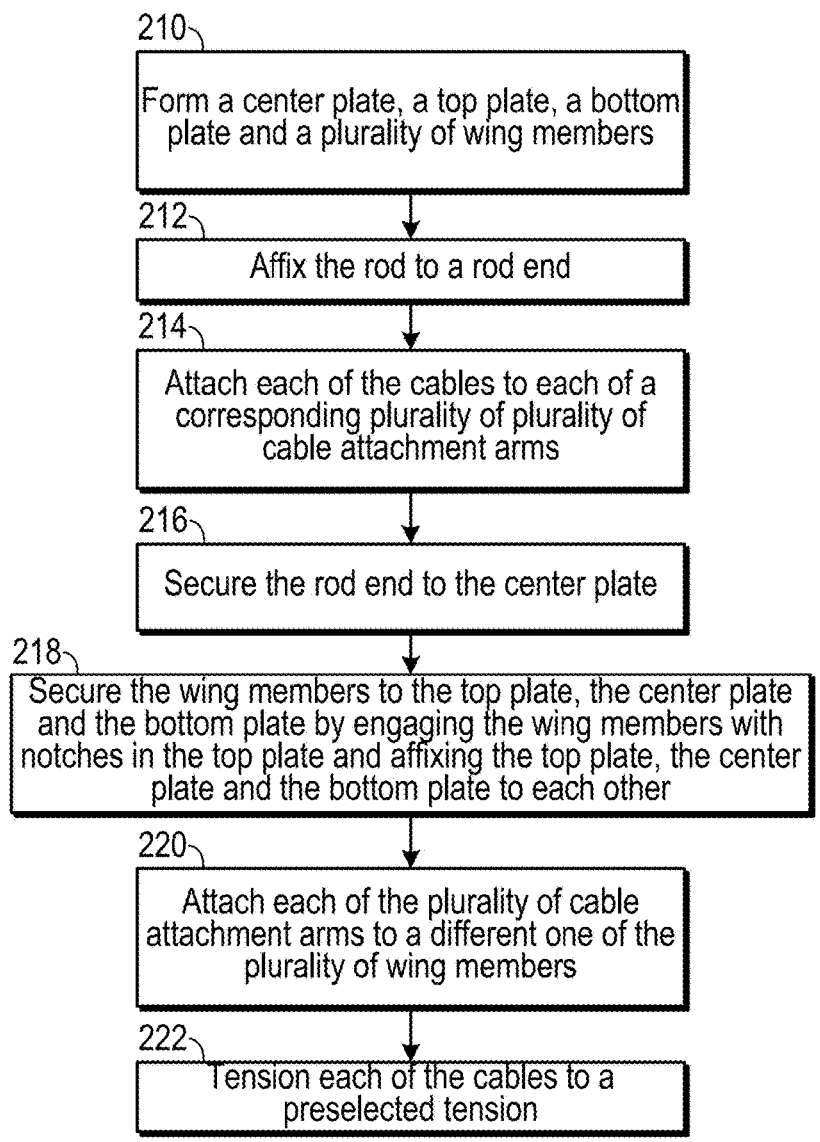
FIG. 7 is a flow chart showing one method of making a joint.

In one method of making a joint, as shown in FIG. 7, the second plate, the first plate, the third plate and the wing members are formed from a substantially flat material 210 and the rod is affixed to the rod end 212. Each of the cables is attached to each of the cable attachment arms 214 and the rod end is secured to the second plate 216. The wing members are secured to the first plate, the second plate and the third plate by engaging the wing members in the notches in the first plate and bolting the first plate, the second plate and the third plate to each other 218. The cable attachment arms are attached to the wing members 220 and the cables are tensioned to a preselected tension 222.

The single joint design can accommodate and arbitrary number of cables incident to the joint, thus simplifying the overall design process of the structure. The planar design of main components allows for rapid manufacturing at minimal cost. All of main components of the system are flat, which allows them to be manufactured through any 2D cutting technique, including but not limited to, waterjet cutting machines, plasma cutting machines, and laser cutting machines. These fabrication techniques are known for being both quick and cost effective.

Figure 8:
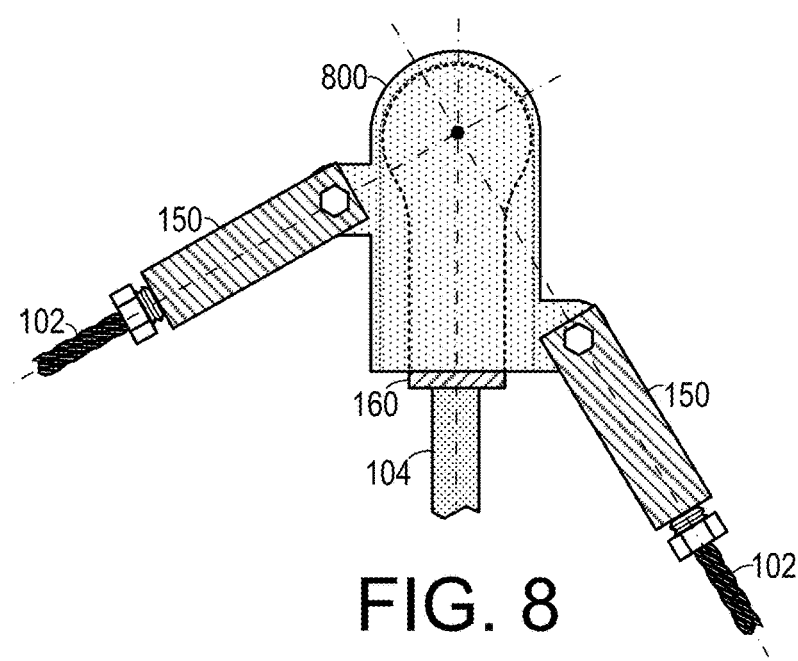
FIG. 8 is a schematic diagram of one embodiment of a joint.

In alternate embodiments, the joint can be manufactured using other methods. For example, alternates to the embodiment employing the three plates disclosed above can include unitary structures that direct the centerlines of the cables and the rod to a single center point. Components of such embodiments could be manufactured using such methods as 3D printing and molding. One example of such an alternate embodiment of a joint 800 is shown in FIG. 8.

Figure 9:
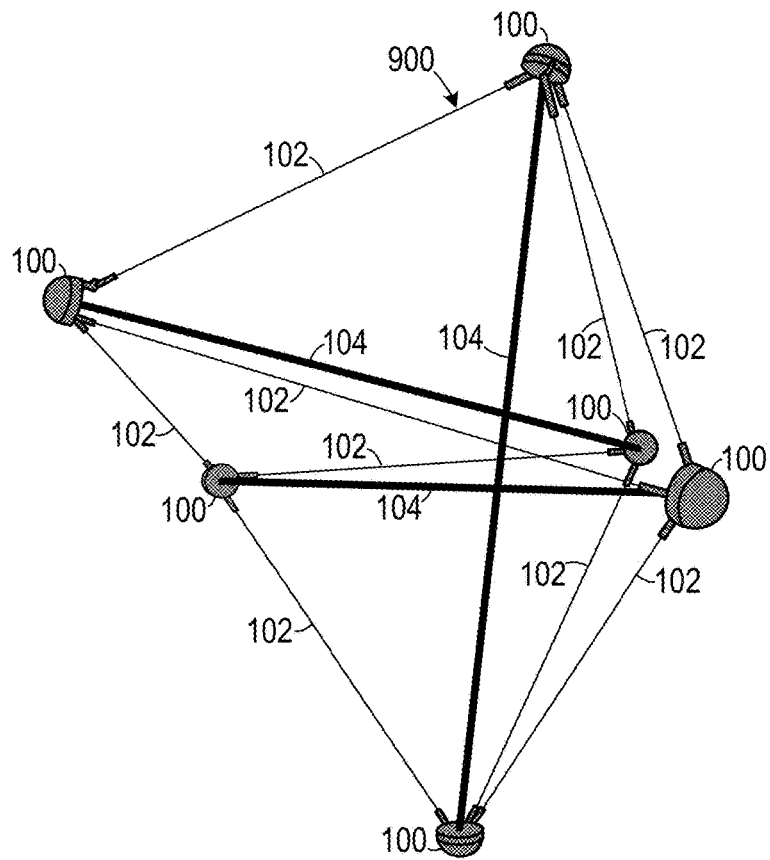
FIG. 9 is a schematic diagram of a tensegrity structure.

The joint disclosed herein can be used in such applications: tensegrity structures, architectural applications (such as bridges), space-based applications (such as planetary landing platforms), and the like. One example of a tensegrity structure 900 using the joint 100 disclosed herein is shown in FIG. 9.

The present invention offers several substantial advantages. The length of each wing is such that the centerline of each incident cable intersects at the center of the rod-end ball. This arrangement prevents the structure from generating moments on the joints. As a result, there is minimal net moment at the joints and they do not rotate, preventing the structure from deviating from its intended shape. Also, the lack of net moment at the joints minimizes the mechanical stresses they are subject to, making the overall structure less prone to mechanical failure. The individual threaded mechanisms on the cable attachments allow for the independent calibration of the stress at each cable of the structure.

The range of commercial applications for the joint can be very broad, as it applies to any structural system that employs rod and cable components. The cables could be either attached to the main structure, or be structural elements themselves. Among possible applications, the invention could be utilized on suspension bridges, cable stayed bridges, long span roof structures, domes, inflatable membrane roofs, cranes, railings, tensegrity structures, space structures such as antennas, satellites and landers, and architectural and aesthetic elements in buildings and public places, etc. Additionally, the modular design of the joint system allows easy manufacture of joints with arbitrary number of incident cables.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A joint for a structure that includes at least one rod and a plurality of cables, each cable having an outside diameter, the joint comprising:
   a rod end that is affixable to the rod so that the rod has a rod centerline that passes through the rod end, the rod end including a mechanism that allows the rod end to pivot about a center point that is on the rod centerline;
   a cable attachment device that is couplable to each of the plurality of cables and that is coupled to the rod end, the cable attachment device configured to hold each of the plurality of cables coupled thereto in a relationship to the rod end so that each of the plurality of cables has a cable centerline that intersects the center point so as to minimize any moments from the rod or the cables on the joint,
   wherein the cable attachment device comprises:
   a plurality of wing members in which each wing member corresponds to a different one of the plurality of cables;
   a first plate that engages each of the wing members so as to hold each wing member in a fixed radial position;
   a second plate, disposed below the first plate, that holds the rod end in a fixed relationship thereto;
   a third plate, disposed below the second plate opposite the first plate, that is attached to the first plate so as to secure the rod end, the second plate, the first plate and each of the plurality of wing members in a fixed spatial relationship; and
   a plurality of cable attachment arms, each configured to attach a different one of the plurality of cables to a corresponding wing member,
   wherein each wing member has a dimension so that when a cable attached thereto is under tension the corresponding cable centerline intersects the center point.

2. The joint of claim 1, wherein the rod end comprises
   (a) a rod holding member that is affixed to the rod, the rod holding member including a portion that defines a circular hole passing therethrough;
   (b) a bearing member held in the circular hole by the rod holding member so as to allow rotational movement of the bearing member; and
   (c) a pin extending outward from each of two opposite sides of the bearing member and transversely from the rod holding member.

3. The joint of claim 2, wherein second plate defines a hole passing therethrough and two indents extending outwardly from the hole, wherein the pin of the rod end is pressed into the indents so as to hold the bearing member in a fixed relationship with the second plate and so that the rod holding member can rotate with respect to the center point of the second plate.

4. The joint of claim 1, wherein each of the plurality of wing members comprises:

(a) an attachment arm attachment portion; and (b) a T-shaped structure extending away from the attachment arm attachment portion that engages both the first plate and the third plate so as to be held in a fixed relationship therewith, the T-shaped structure including a first protrusion extending upwardly therefrom and a second protrusion extending downwardly therefrom.

5. The joint of claim 4, wherein each of the plurality of wing members includes an extension between the attachment arm attachment portion and the T-shaped structure, the extension having a length chosen so that the cable centerline intersects the center point.

6. The joint of claim 4, wherein the first plate defines a center hole passing therethrough that has a size that receives a top portion of the rod end therein while inhibiting upward vertical movement of the rod end and wherein the first plate defines a plurality of notches passing therethrough, each notch having a shape that is complimentary to the first protrusion from the T-shaped structure so as to hold the first protrusion from the T-shaped structure in a predetermined position.

7. The joint of claim 4, wherein the third plate defines a rectangular opening passing therethrough that receives a bottom portion of the rod end therein while inhibiting downward vertical movement of the rod end, and wherein the third plate defines at least one semi-circular opening passing therethrough that is concentric with the rod end and that engages the second protrusion from the T-shaped structure so as to prevent radially outward movement of the wing member.

8. The joint of claim 1, further comprising at least one fastener that secures the first plate, the second plate and the third plate.

9. The joint of claim 8, wherein the first plate, the second plate and the third plate each define at least one hole passing therethrough that receives the at least one fastener therein.

10. The joint of claim 1, wherein each cable attachment arm comprises:

(a) an elongated member having a first end and an opposite second end, a threaded bore extending inwardly from the first end, the second end defining a notch that is complimentary in shape to a portion of one of the wing members;

(b) a screw portion, having a first end and an opposite second end, that is in threaded engagement with the threaded bore, the screw portion defining an elongated passage that passes from the first end to the second end and that has an inside diameter that is greater than the outside diameter of one of the plurality of cables, so that a portion of the one of the plurality of cables can pass through the elongated passage; and (c) a terminator that is affixed to an end of one of the cables so as to prevent the portion of the one of the cables from being pulled out of the elongated passage, wherein the once the one of the cables is passed into the elongated passage and the terminator is affixed to the end, the screw portion is screwed into the bore and one of the wing members is placed in the notch and affixed to the elongated member and fastened thereto.

11. The joint of claim 1, further comprising a spherical cap disposed on the first plate, the spherical cap having a center of curvature corresponding to the center point of the central plate so that any impact force experienced by the spherical cap will be directed radially inwardly toward the center point.

12. A method of making a joint for a structure that includes at least one rod and a plurality of cables, each cable having an outside diameter, comprising:

(a) forming, from a substantially flat material, a second plate, a first plate, a third plate and a plurality of wing members;

(b) affixing the rod to a rod end;

(c) attaching each of the cables to each of a corresponding plurality of plurality of cable attachment arms;

(d) securing the rod end to the second plate;

(e) securing the wing members to the first plate, the second plate and the third plate by engaging the wing members with notches in the first plate and affixing the first plate, the second plate and the third plate to each other;

(f) attaching each of the plurality of cable attachment arms to a different one of the plurality of wing members; and (g) tensioning each of the cables to a preselected tension.

13. The method of claim 12, wherein forming the second plate, the first plate, the third plate and the plurality of wing members comprises cutting the second plate, the first plate, the third plate and the plurality of wing members from sheet material.

14. The method of claim 13, wherein cutting comprises cutting the sheet material with a method selected from a list of cutting methods consisting of: water jet cutting, plasma torch cutting, laser cutting, die cutting, rotary cutting and lithographic cutting.

15. The method of claim 12, wherein forming the second plate, the first plate, the third plate and the plurality of wing members comprises using a forming method selected from a list of forming methods consisting of: 3D printing, injection molding, and extruding.

16. The method of claim 12, further comprising selecting a geometry for at least one of the wing members so that a cable affixed to a cable attachment arm that is affixed to the one of the wing members has a preselected angle with respect to the rod and has a centerline that intersects a center point of the rod end.

17. The method of claim 12, further comprising manufacturing the cable attachment arms by executing:

(a) drilling an elongated passage along a centerline of a screw so that the passage has an inside diameter that is greater that the outside diameter of one of the cables;

(b) threading the one of the cables through the passage so that an end of the one of the cables extends out of an end of the screw;

(c) terminating the end of the one of the cables with a terminator that prevents the end of the one of the cables from slipping out of the elongated passage;

(d) forming a threaded bore, that is complimentary in shape and in threading to the screw, into a first end of an elongated member;

(e) screwing the screw into the threaded bore so as to affix the cable to the elongated member; and (f) tightening the screw until the cable is under a desired amount of tension.

18. The method of claim 17, further comprising:

(a) cutting a notch at a second end, opposite the first end, of the elongated member so that the notch has a width that is wider than a thickness of one of the wing members;

(b) drilling a hole adjacent to the second end that is transverse to the notch;

(c) drilling a hole in a portion of the one of the wing members;

(d) placing the portion of the one of the wing members in the notch so that the hole that is adjacent to the second end aligns with the hole in the portion of the one of the wing members; and (e) inserting a fastener through the hole that is adjacent to the second end and the hole in the portion of the one of the wing members, thereby affixing the one of the wing members to the elongated member.

\* \* \* \* \*